United States Patent [19]

Mitchell et al.

[11] 4,162,501

[45] Jul. 24, 1979

[54] INK SUPPLY SYSTEM FOR AN INK JET PRINTER

[75] Inventors: Charles S. Mitchell, Palo Alto; Glenn D. Maxwell, Saratoga, both of Calif.

[73] Assignee: Silonics, Inc., Sunnyvale, Calif.

[21] Appl. No.: 822,538

[22] Filed: Aug. 8, 1977

[51] Int. Cl.[2] .............................................. G01D 15/16

[52] U.S. Cl. ................................ 346/140 R; 101/366; 141/329; 222/320; 222/340; 222/326; 239/309; 239/321

[58] Field of Search .................... 346/140 R; 141/329, 141/330, 20.5, 24; 222/320, 340, 386.5, 326; 101/366; 401/134, 135, 180; 239/321, 323, 309

[56] References Cited

U.S. PATENT DOCUMENTS

| | | | |
|---|---|---|---|
| 1,957,545 | 5/1934 | Krueger | 222/340 X |
| 3,708,798 | 1/1973 | Hildenbrand | 346/140 R |
| 3,788,519 | 1/1974 | Mengel | 141/329 X |
| 4,017,870 | 4/1977 | Hubbard | 346/140 A |
| 4,038,667 | 7/1977 | Hou | 346/140 R |
| 4,074,284 | 2/1978 | Dexter | 346/140 R |

FOREIGN PATENT DOCUMENTS

| | | | |
|---|---|---|---|
| 2460573 | 7/1976 | Fed. Rep. of Germany | 346/140 R |

*Primary Examiner*—Joseph W. Hartary

*Attorney, Agent, or Firm*—Limbach, Limbach & Sutton

[57] ABSTRACT

An ink supply system for an ink printer having a pressurizable, interchangeable ink cartridge, means for pressuring the ink cartridge upon insertion into the ink cartridge receptacle, and means for establishing fluid communication between the interior of the ink cartridge and the ink supply line to the ink jet printer before pressurization of the ink cartridge occurs. The present ink supply system also includes an improved septum and needle method of establishing fluid communication.

24 Claims, 8 Drawing Figures

FIG. 3
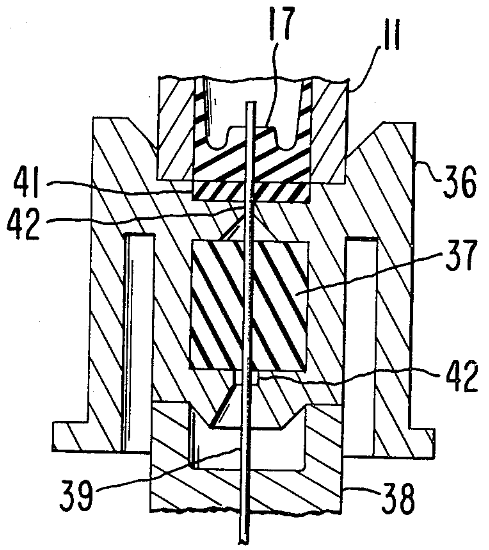
FIG. 4
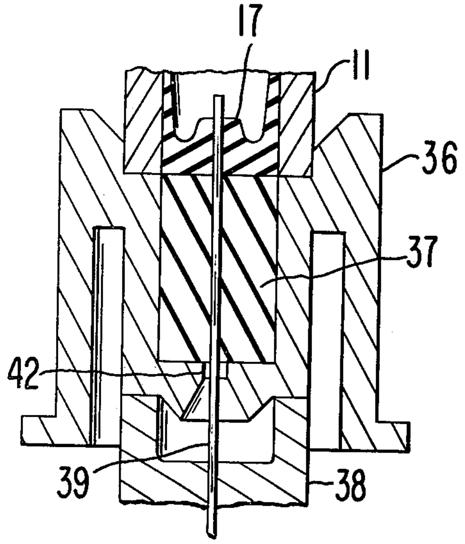
FIG. 6
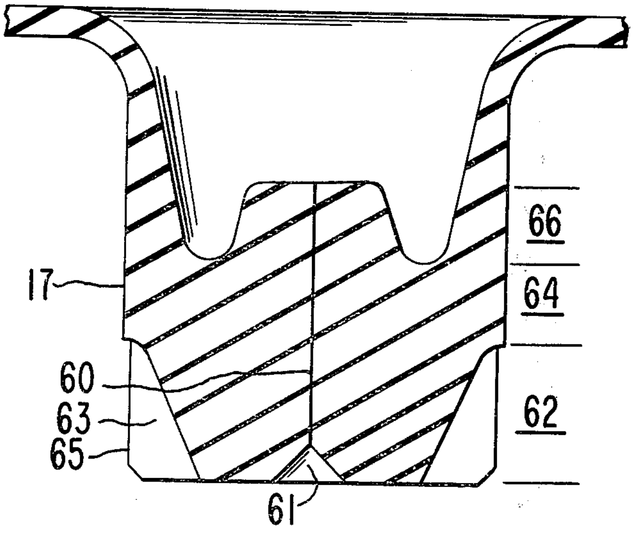
FIG. 7
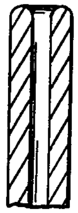
FIG. 5
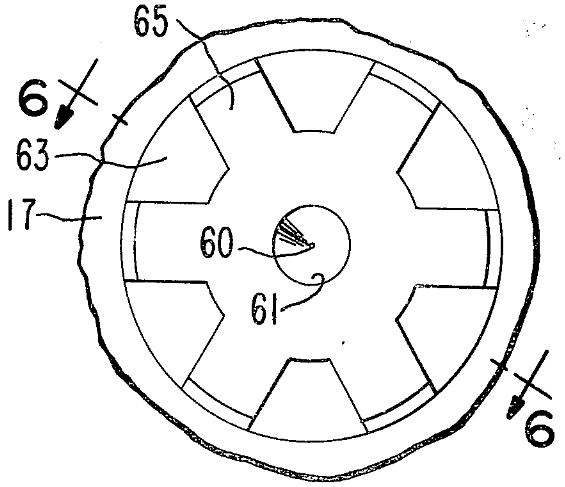
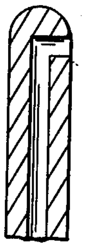
FIG. 8

INK SUPPLY SYSTEM FOR AN INK JET PRINTER

BACKGROUND OF THE INVENTION

This invention relates generally to the art of non-impact ink jet printing, and more particularly to ink supply systems for ink jet print heads.

An asynchronous volume displacement droplet ejection type of ink jet head is described in U.S. Pat. No. 3,946,398—Kyser et al (1976) and co-pending patent application Ser. No. 489,985, filed July 19, 1974, both assigned to the assignee of the present application. A piezoelectric element is associated with an ink jet chamber, resulting in ejecting a droplet of ink from a nozzle of the chamber with sufficient velocity for it to travel to a recording medium. One such droplet forms a portion of a character to be printed. A plurality, such as seven of nine, print heads of this type are preferably built as a single structure that is mechanically swept across a recording medium upon which the printing is taking place line by line. At each column of the printing line the appropriate number of the independently controllable ink jet chambers are fired by pulsing their respective piezoelectric elements to eject ink drops therefrom.

Such ink jet heads require, of course, a supply of ink to their chambers to replace the ink that is ejected as droplets. An ink supply system for the asynchronous type of ink jet head which utilizes a pre-filled insertable ink cartridge is described in co-pending patent application Ser. No. 807,219, filed June 16, 1977, a division of co-pending application Ser. No. 694,064, filed June 7, 1976, both of which are assigned now U.S. Pat. No. 4,074,284, issued Feb. 14, 1978, to the same assignee as the present application. The goal of prior ink supply design efforts have been to deliver ink under constant pressure and free of bubbles and impurities. Other efforts have been directed toward making ink containers refillable or interchangeable. However, much of this prior work is not entirely effective for many particular applications.

It is an objective of the present invention to provide an improved technique for supplying ink to an ink jet printer under constant pressure over time that is above atmospheric pressure.

It is another objective of the present invention to deliver ink free from contamination by bubbles and impurities.

It is a further objective of the present invention to supply ink in a manner that the ink container can readily be removed and replaced by another container.

SUMMARY OF THE INVENTION

In accordance with this invention, an ink container takes the form of an ink cartridge including a piston, a piston housing forming most of the body of the cartridge, and a flexible diaphragm to seal the piston with respect to the housing. All of these are made of fluid impervious materials. A septum is provided in the piston to allow fluid communication between the interior of the cartridge and the supply line to the ink jet print head through a hollow needle mounted in the cartridge receptacle. A shroud biased upward by a spring in the receptacle engages the piston upon the cartridge's insertion into the receptacle and pressurizes the cartridge. The cartridge is then rotated and detents on the receptacle engage the cartridge housing to hold it in place. Further rotation or rotation in the opposite direction disengages the detents and the cartridge is lifted off and removal is complete. As ink is withdrawn from the cartridge, the piston moves upward under influence of the spring to maintain the reduced volume of ink under pressure.

Also mounted on the shroud is a vertically movable coupling which is also biased upward by a spring. The coupling contains a rubber cap which moves over the hollow needle upon the removal of the ink cartridge from the receptacle. This seals the ink supply line from unwanted air bubbles and impurities. The sliding coupling further guides the cartridge into the correct position with respect to the needle and receptacle and allows the needle to pierce the septum of the cartridge before it is pressed down completely and rotated to engage the container detents for mounting. Fluid communication is therefore established before the cartridge piston is loaded upward for full pressurization of the ink cartridge and ink spillage is thus avoided. No ink is stored in the cartridge under pressure before installation on the receptacle.

In addition, ink leakage prevention is enhanced with the use of a rounded, hollow needle through a prepunctured septum in place of the standard needle and septum in the prior art.

Thus, by the above means, ink can be supplied to an ink jet printer with constant pressure until exhaustion of the ink cartridge. The cartridge is readily removed and another inserted for continued printing. The cartridge and receptacle are both completely sealed when they are separated from each other. No contamination of the ink by air or impurities can occur. One further result is that there is little chance of staining the operator's hands in the cartridge replacement operation.

Additional objects, advantages and features of the various aspects of the present invention will become apparent from the following description of its preferred embodiments which should be taken in conjunction with the accompanying drawings.

BRIEF DESCRIPTION OF THE DRAWINGS

FIGS. 3 and 4 illustrate variations of certain receptacle components of the embodiments of FIGS. 1 and 2;

FIG. 5 illustrates a preferred structure of a component of the ink cartridge embodiment of FIGS. 1 and 2 in top view;

FIG. 6 is a sectional view of the component of FIG. 5 taken across section 6—6 thereof; and FIGS. 7 and 8 illustrate in an enlarged scale two specific alternative structures of a component of the receptacle embodiment shown in FIGS. 1 and 2.

DETAILED DESCRIPTION OF THE PREFERRED EMBODIMENTS

Figure 1:
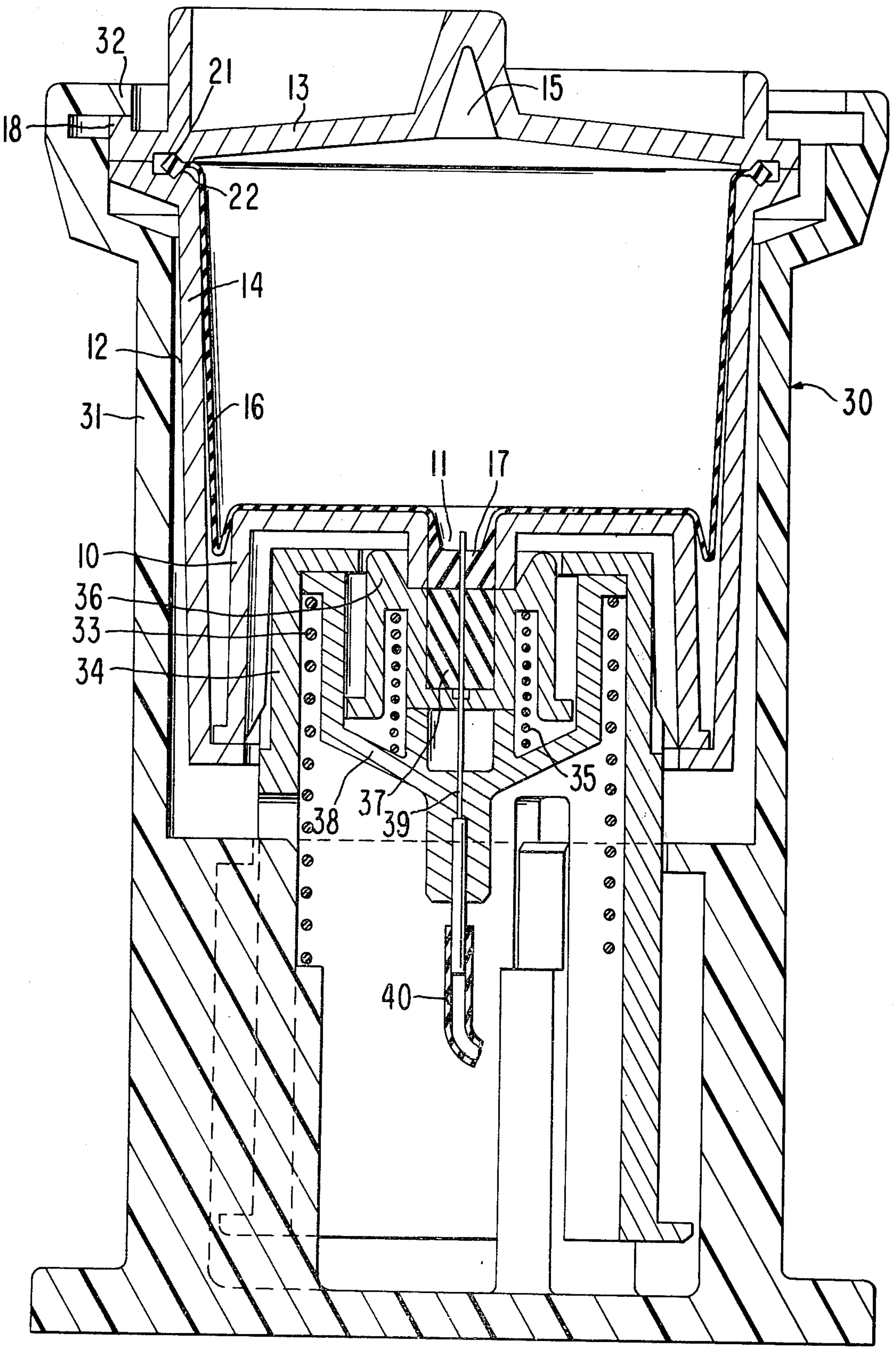
FIG. 1 is a vertical sectional view of an ink cartridge receptacle with a ink cartridge mounted thereon.

For the ink supply cartridge (FIG. 1), a piston 10 slides up a cartridge housing 12, consisting of a side housing 14 and a cartridge top 13. A flexible, fluid impermeable diaphragm 16 seals the piston with respect to a housing 12 of the cartridge, while allowing the piston to slide. The seal for the piston occurs in the form of a rolling diaphragm. The edges of the diaphragm, preferably made of soft rubber that is chemically resistant to the ink, such as butyl, are thickened so as to be held by annular protrusions 21 and 22 of the top 13 and a side housing 14, respectively, to form a sealing gasket. Furthermore, since it is preferable to mold side housing 14 and top 13 out of polystyrene plastic, resistant to both high impact and chemical reaction with the ink, the top and side housing can be ultrasonically welded to form a further seal against ink leakage. Lugs 18 are mounted on the top 13 to engage detents 32 on a receptacle 30 to hold the ink supply container in place.

It has been found preferable to attach a septum 17 to the center of the piston 10, although other locations on the housing are possible. The septum 17 is prepunctured to receive a needle 39 therethrough. Furthermore, the septum 17 can conveniently be molded as part of the diaphragm 16 as a unitary, fluid tight element. In molding the septum 17, it is best to make it slightly larger than the piston 10 so as to allow the septum 17 to frictionally engage the sides of the circular inlet 11. The septum 17 can be pushed into the inlet 11 and it will remain there without the use of adhesives. Also, the tight fit between the inlet 11 and septum 17 causes the rubber to be in compression. The compression forces cause the rubber of the septum 17 to close tightly behind the needle 39 as it is extracted from the cartridge, thus resealing the cartridge.

FIGS. 5 and 6 show a preferred embodiment of the septum 17. This design for the septum allows the septum to be in place by frictional force. When a needle is inserted, it spreads the rubber of the septum causing even greater force against the side wall. The frictional retaining force is increased. This helps counteract the axial force on the septum generated by the pressure of the needle pressing through the septum which tends to force the septum out of the inlet. Thus, a feature of the design is that the frictional force of the side wall is made greater than the needle force which tends to push the septum out of the inlet.

Figure 2:
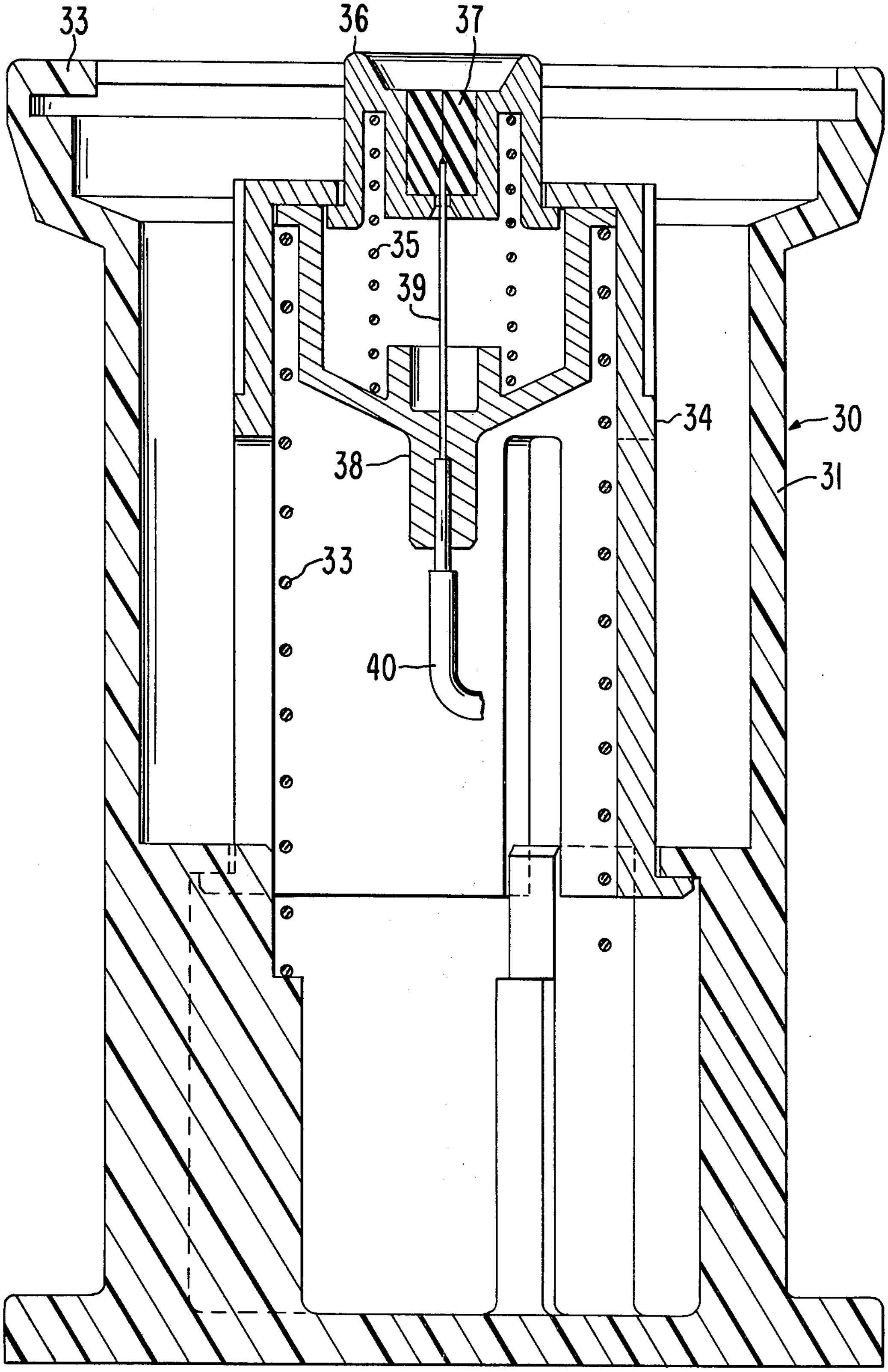
FIG. 2 is a sectional view of the ink cartridge receptacle of FIG. 1 but with the ink cartridge removed therefrom.

Referring to FIGS. 5 and 6, the septum 17 is discussed by three horizontal zones, 62, 64 and 66. A prepunctured hole 60 passes through the center of the septum 17 and through all three zones. This hole is precisely cut with the needle having a sharp point and a longer taper. A hollow needle 39 having a rounded point is then used for establishing fluid communication with the interior of the cartridge. These needles do not cut the rubber, but pry open the walls of the hole previously opened in the rubber. Thus, the hollow needle 39 continually uses the same pathway, avoiding further holes in the septum and allowing a more effective seal. FIGS. 7 and 8 show two embodiments of rounded point, hollow needles that may be employed as the needle 39 (FIGS. 1 and 2).

It is clear that use of a prepunctured septum and a rounded point, hollow needle need not be restricted to pressurizable cartridges as discussed herein, but may be substituted for any previous septum and needle system.

To help steer the hollow needle into previously punctured hole 60, conical inlet 61, a part of zone 62, is placed at the bottom of the hole 60. In the zone 62, the rubber of the septum 17 includes notches 63 which provide room for rubber expansion as the needle passes through. The notches reduce axial force which tend to force the septum out of position. Between the notches, rubber ribs 65 transmit compressive forces to the walls of the piston inlet 11 which increase friction tending to retain the septum in position. When the needle is removed, compressive forces remain in the rubber because of support from the side walls and thus the hole 60 is squeezed shut.

In the zone 64, there is solid rubber backed up by support from the walls. The rubber is in compression before needle insertion and after needle removal. Those forces seal the pre-cut hole. The zone 64 being thin compared to its diameter acts like a diaphragm. When the needle is applied at the center, the rubber stretches. The stretching puts the rubber in tension and reduces the force required for needle penetration. It also reduces the frictional retaining force at the walls in the zone 64, with the retaining force in zone 62 sufficient to prevent dislocation of the septum. If the rubber did not bow and stretch in zone 64, the force required to insert the needle would likely be unacceptably high.

In zone 66, there is no side wall support and thus no compressive force in the rubber initially. When the needle penetrates zone 66, the rubber opens and spreads into the open space provided. The force required to penetrate is low, because there is no resistance to the movement of the rubber other than the tensile forces in the rubber itself. No septum retention force is provided in zone 66. A sealing force is provided when the needle is removed from the zone 66 by the internal tensile forces combined with the pressure of the ink in the cartridge.

The ink cartridge is filled by first piercing the septum 17 with precision with a sharp tapering needle. Through this pre-cut hole, a hollow needle allows ink to flow into a chamber created by the diaphragm 16 and the cartridge top 13. As the cartridge becomes full, the piston reaches its lowest or fullest extended position. At this point, detents on the cartridge housing prevent the piston from disengaging the cartridge housing. Due to the slight slope toward the center of the top 13, air tends to flow into the conically shaped space 15 provided at the center of the top 13. During the process of filling the cartridge with ink, a hollow needle is inserted through the septum. Its tip goes to the top of the space 15 and draws off any gas or air which has collected there.

Referring to FIGS. 1 and 2, the receptacle 30 includes a receptacle housing 31 on which is mounted detents 32 which lock the ink cartridge in place. Locking is accomplished by rotating the cartridge around its axis after it is fully inserted, engaging the detents, as shown in FIG. 1. Through a connector 38, a load spring 33 urges upward a shroud 34 which contains the spring 33 and limits its extension. The shroud 34 has slots accepting lugs on housing 31 to allow vertical movement without rotation. The spring 33 applies a force against the cartridge piston 10 when the cartridge is positioned in the receptacle, thus pressurizing the ink inside the container. The spring 33 also provides a force against the cartridge housing 14 which holds it in the detents of the receptacle housing 14. A slidable coupling 36 mounted at the center of the shroud 34 engages the ink container, and also locates and guides a rounded point, hollow needle 39 in the receptacle to the center of the septum 17 as the cartridge is lowered into the receptacle. Furthermore, the coupling 36 provides a rubber cap 37 over the needle to seal it against air and impurities when the container is removed (see FIG. 2). Also, since the piston inlet 11 of the cartridge for receiving the septum contacts the coupling 36 to guide the cartridge into proper placement in the receptacle and to provide the force path along which the cartridge is pressurized, the load on the piston as the cartridge is inserted is toward the center. Less torque can be transmitted between the cartridge and the receptacle when the cartridge is rotated against spring pressure for locking into the detents.

A connector 38 retains the needle 39 used for penetrating the septum in the container and connects the needle to flexible tubing 40 to supply the ink to an ink jet print head. A coupling spring 35 applies a force between the coupling 36 and the connector 38 to pull a rubber cap 37, which is part of the coupling 36, over the end of the needle 39 and to seal it when a cartridge is not in the receptacle. When a cartridge is inserted into the receptacle, the spring 35 is compressed. The coupling 36 moves relative to the connector 38, causing the needle 39 to emerge from the sealing cap 37 and to penetrate the septum 17 in the cartridge. The coupling spring 35 is chosen to be weaker than the load spring 33 so that the needle will penetrate the septum of the cartridge before the load spring is compressed to fully pressurize the ink in the cartridge. In this manner, ink spillage is greatly reduced since the cartridge is penetrated while only slightly pressurized by the coupling spring. After fluid communication is established, then the load spring is depressed as the cartridge is locked into place on the receptacle to fully pressurize the cartridge.

As a matter of construction, all rigid parts of the receptacle, except the metal springs, are made of easily moldable plastic. A non-inflammable plastic under the name "Noryl", a trademark of the General Electric Corp., is used for the shroud 34 and receptacle housing 31. The coupling 36 and the connector 38 use acetyl plastic for its low friction and strength. Materials which are soft, weather-resistant and have low compression set, such as neoprene and ethylene propylene, should be chosen for the rubber cap 37 and the contact pad 41.

FIGS. 3 and 4 show two different embodiments of the coupling 36 of FIGS. 1 and 2 which prevent a drop of ink from the needle or the septum from being deposited either on the septum or the receptacle at the point of the needle passage when the needle is removed from the ink container and withdrawn to its rubber sheath in two receptacle. Both embodiments place a rubber contact in the receptacle which will contact the septum and be in compression before, during and after passage of the needle tip. Compression will not be released until after other mechanisms in the receptacle and cartridge can seal the interior of the container and receptacle from the interface surface.

FIG. 4 entails one such embodiment. The rubber cap 37 is bonded to the coupling 36. Its length is such that it extends above the surface against which the piston is seated. This causes the cap to be in compression at the interface, performing the sealing function during the passage of the needle. The embodiment of FIG. 3 has a separately protruding rubber contact pad 41 and needle guide 42 directly below fixed to the coupling 36. Of consideration between the two embodiments is that the one in FIG. 4 places the needle guide 42 further away from the point of needle entry into the septum than the embodiment in FIG. 3. However, the spring force provided by the rubber needle sheath tends to force the needle towards the center line for proper entry through the septum. Moreover, this embodiment in FIG. 4 is slightly less expensive because it involves fewer parts.

The various aspects of the present invention have been described with respect to particular embodiments thereof, but it will be understood that the invention is entitled to protection within the full scope of the appended claims. For example, it is easily recognizable that the present invention can be used with liquids other than ink and in areas other than ink jet printing.

We claim:

1. A sealed pressurizable and interchangeable ink cartridge for an ink jet printer having a cartridge receptacle with an ink supply connector protrudable therefrom, said cartridge comprising:

- a housing adapted to be received by the printer receptacle,
- a piston slidably engaged within said housing,
- means for providing a fluid seal between the piston and said housing as it slides back and forth therein, and
- a septum carried by said piston and forming a sealed inlet that is penetratable by said receptacle connector, whereby fluid communication is achieved between the interior of the cartridge and the receptacle and further whereby the cartridge can be pressurized by moving said piston with respect to said housing to reduce the fluid volume therein.

2. An ink cartridge as recited in claim 1, wherein the piston fluid seal comprises a fluid impermeable, rolling diaphragm.

3. A sealed, pressurizable and interchangeable ink cartridge for an ink jet printer having a cartridge receptacle that includes an ink supply connector, cartridge mounting means and a resilient means, said cartridge comprising:

- a piston,
- a cartridge housing accepting said piston,
- means for slidably sealing the piston with respect to said housing,
- means as part of said cartridge housing for detachably connecting said cartridge to said receptacle in a manner that said resilient means engages the piston with respect to the housing and thereby pressurizes the ink cartridge upon insertion into the receptacle, and
- a septum forming a sealed inlet in said piston which is penetratable by said connector upon insertion of the cartridge onto the receptacle, whereby fluid communication is achieved between the interior of the cartridge and the receptacle upon penetration of the septum by the ink supply connector.

4. A sealed pressurizable and interchangeable ink cartridge for an ink jet printer having a cartridge receptacle with an ink supply connector protrudable therefrom, said cartridge comprising:

- a generally cylindrically shaped cartridge housing with one end closed,
- a cup-shaped rolling diaphragm having a thickened, outwardly protruding section on its axis and that is penetratable by said receptacle connector, said diaphragm being sealingly affixed to the interior walls of said housing towards the closed end, whereby a sealed fluid container is formed, and
- a piston having an aperture on its axis, said piston being slidably mounted within said housing and engaging said diaphragm in a manner that said diaphragm forms an annular loop around the sides of said piston and the aperture fixedly retains the protruding section of said diaphragm, whereby fluid communication is achieved between the interior of the cartridge and the receptacle, and further whereby the cartridge can be pressurized by moving said piston with respect to said housing to reduce the fluid volume therein.

5. A sealed, pressurizable and interchangeable ink container as recited in claim 4, wherein the thickened, outwardly protruding section of said diaphragm is fixedly retained in the aperture of said piston in a manner that the thickened section remains in the aperture upon penetration by the receptacle connector and remains sealed upon removal of the connector.

6. A sealed, pressurizable and interchangeable ink container as recited in claim 4, wherein the thickened section of the diaphragm is prepunctured to receive said receptacle connector.

7. An ink supply system for an ink jet printer, comprising:

an ink supply receptacle having a needle for receiving ink therethrough, an ink supply cartridge housing closed at one end, another end of said housing and said receptacle having mating connecting elements for removably securing the cartridge to the receptacle, whereby the cartridge may be replaced when its ink supply is exhausted, a piston as part of said cartridge and entering said housing from said another end thereof, means for providing a fluid seal between said piston and an inside of said housing, thereby to form an ink supply chamber, means carried by said piston for accepting said ink supply needle therethrough in a fluid-tight manner to establish a fluid supply path for ink from said chamber to the receptacle as said cartridge is secured to the receptacle, and resilient biasing means carried by said receptacle and movable with respect thereto for constantly urging said piston inward of said housing to compress ink therein when said cartridge is secured to the receptacle, thereby to maintain a pressure sufficient to force ink out of the cartridge through said needle.

8. An ink supply system for an ink jet printer, comprising:

an ink supply receptacle having a needle for receiving ink therethrough, an ink supply cartridge housing closed at one end, another end of said housing and said receptacle having mating connecting elements for removably securing the cartridge to the receptacle, whereby the cartridge may be replaced when its ink supply is exhausted, a piston as part of said cartridge and entering said housing from said another end thereof, means for providing a fluid seal between said piston and an inside of said housing, thereby to form an ink supply chamber, means carried by said piston for accepting said ink supply needle therethrough in a fluid tight manner to establish a fluid supply path for ink from said chamber to the receptacle, and resilient biasing means carried by said receptacle and movable with respect thereto for constantly urging said piston inward of said housing to compress ink therein when said cartridge is secured to the receptacle, thereby to maintain a pressure sufficient to force ink out of the cartridge through said needle, said resilient biasing means normally being urged a maximum distance out of said receptacle, said needle is carried by and movable with said biasing means, whereby an ink supply cartridge is inserted onto said receptacle by inserting a needle through said needle accepting means prior to pressurizing the ink by compressing said resilient biasing means, and whereby an ink supply cartridge is removed from said receptacle by releasing said biasing housing means to depressurize the ink prior to removing the needle from the needle accepting means.

9. The ink supply system according to claim 8 wherein said needle accepting means comprises a prepunctured septum, and further wherein said needle includes a hollow passage therein and a rounded head, thereby to be forceable through an opening prepunctured in said septum.

10. A liquid supply system, comprising:

a liquid supply receptacle having a hollow needle for receiving liquid therethrough, a liquid supply cartridge housing closed at one end, another end of said housing and said receptacle having mating connecting elements for removably securing the cartridge to the receptacle, whereby the cartridge may be replaced when its liquid supply is exhausted, a piston as part of said cartridge and entering said housing from said another end thereof, means for providing a fluid seal between said piston and an inside of said housing, thereby to form a liquid supply chamber, means carried by said piston for accepting said liquid supply needle therethrough in a fluid-tight manner to establish a liquid supply path from said chamber to the receptacle as said cartridge is secured to the receptacle, and resilient biasing means carried by said receptacle and movable with respect thereto for constantly urging said piston inward of said housing to compress ink therein when said cartridge is secured to the receptacle, thereby to maintain a pressure sufficient to force liquid out of the cartridge through said needle.

11. A sealed pressurizable and interchangeable liquid cartridge for removable attachment to a cartridge receptacle having a liquid supply conduit thereon, said cartridge comprising:

a hollow cartridge housing having one end closed, a piston positioned within said housing in a manner to be slidable from a position toward an opposite end of said housing to a position toward said one closed end, said piston having an aperture therein, and a cup-shaped rolling diaphragm sealingly affixed to interior walls of the housing to form a liquid tight chamber, said piston engaging said diaphragm in a manner that said diaphragm forms an annular loop at the sides of said piston in order that movement of said piston relative to the housing varies the volume of said chamber, said diaphragm containing an area aligned with said piston aperture that is penetrable by said conduit but which is normally closed to liquid flow therethrough, whereby liquid communication is achieved between the interior of the cartridge and the receptacle when the supply conduit is urged through the diaphragm penetrable area, and further whereby the cartridge may be pressurized by moving said piston toward the closed end of said housing to reduce the liquid volume therein.

12. The liquid cartridge according to claim 11 wherein said liquid chamber contains ink of a type especially adapted for use in an ink jet printer.

13. A sealed, pressurizable and interchangeable liquid cartridge for removable attachment to a cartridge receptacle having a liquid supply needle carried by a resiliently loaded element and means for firmly receiving a cartridge, said cartridge comprising:

a generally cylindrically-shaped hollow cartridge housing having one end closed, a generally circular piston positioned within said housing in a manner to be slidable from a position toward an opposite end of said housing to a position toward said one closed end, said piston having an aperture therein at its center, and a cup-shaped liquid tight diaphragm having a thickened protruding section that is compressively fitted within the aperture of said piston, said protrusion being punctured in a position aligned for receipt of said needle therethrough as said cartridge housing is attached to the cartridge receiving means of the receptacle, said diaphragm further forming an enclosed liquid compartment in conjunction with said housing, whereby a sealed liquid container is formed that is capable of delivering liquid through said needle when forced through the punctured portion of said diaphragm protruding section under a pressure determined by the influence of said resiliently loaded element against the cartridge piston.

14. The liquid cartridge according to claim 13 wherein said liquid chamber contains ink of a type especially adapted for use in an ink jet printer.

15. A liquid supply system comprising:

a receptacle and liquid supply cartridge having mating holding and locking elements for easy removal and attachment of said cartridge and receptacle, a piston provided as part of said cartridge and sealed therewith in a manner to form a liquid tight chamber within said cartridge whose volume is determined by the position of the piston within the cartridge, said piston being accessible from one end of said cartridge for urging thereinto to reduce the liquid chamber volume, a resilient structure held within said receptacle in a manner to urge said piston into said housing when the cartridge is attached to the receptacle, thereby to compress the liquid therein, a needle carried by said resilient structure and extending towards said cartridge, and means carried by said piston for accepting said needle therethrough in a liquid tight manner as the cartridge is attached to said receptacle, thereby to estalish a liquid path from the cartridge liquid chamber through the needle.

16. The liquid supply system according to claim 15 wherein said cartridge liquid chamber is formed of elements comprising a cup-shaped rolling diaphragm having a thickened protruding compressible section carrying said needle accepting means in the form of a puncture, said protruding means being tightly held in an aperture within said piston in a manner to be liquid tight absent said needle being present therein, said diaphragm being sealingly affixed to the interior walls of said housing to form said liquid chamber and being held by said piston in a manner to form an annular loop at the sides of said piston.

17. The liquid cartridge according to claim 16 wherein said needle is rounded at its end and contains a liquid opening on its side near said end.

18. The liquid supply system according to claim 16 wherein said liquid chamber of the cartridge contains ink, and further wherein said receptacle is part of an ink jet printer.

19. The liquid supply system according to claim 15 which additionally comprises means for sealing said needle when the cartridge is disconnected from said receptacle, said sealing means comprising a sealing cap slidably carried by said needle and normally urged by a spring to cover an opening adjacent an end of said needle, said spring being compressed as the cartridge is attached to the receptacle, said spring additionally being much softer than said resilient structure so that the resilient structure is not compressed by movement of said seal along the needle away from its said opening.

20. The liquid supply system according to claim 19 wherein said needle is rounded at its end and contains a liquid opening on its side near said end.

21. The liquid supply system according to claim 19 wherein said liquid chamber of the cartridge contains ink, and further wherein said receptacle is part of an ink jet printer.

22. The liquid supply system according to claim 15 wherein said liquid chamber of the cartridge contains ink, and further wherein said receptacle is part of an ink jet printer.

23. A liquid supply system of a type having a liquid supply cartridge that is removably held by a receptacle to establish a liquid supply path between a liquid chamber within said cartridge and said receptacle, comprising:

means accessible from one end of said cartridge for controlling the size of its said liquid chamber upon movement thereof, cooperative means carried by said cartridge and receptacle and that are physically aligned to mate upon attachment of said cartridge to said receptacle for establishing said liquid supply path, and means carried by said receptacle for urging against said liquid chamber size controlling means of said cartridge when said cartridge is attached to said receptacle, thereby to pressurize liquid within said chamber to force the liquid out through said supply path, said urging means fully operating as said cartridge is placed on the receptacle but only after said liquid supply path has been established.

24. The liquid supply system according to claim 23 wherein said liquid chamber of the cartridge contains ink, and further wherein said receptacle is part of an ink jet printer.

* * * * *